United States Patent [19]

Treinies et al.

[11] Patent Number: 5,759,133
[45] Date of Patent: Jun. 2, 1998

[54] METHOD AND ENGINE CONTROL FOR SUPPRESSING VIBRATION OF THE DRIVE TRAIN IN A MOTOR VEHICLE

[75] Inventors: Stefan Treinies; Thomas Vogt; Andreas Haeuser, all of Regensburg, Germany

[73] Assignee: Siemens Aktiengesellschaft, Munich, Germany

[21] Appl. No.: 816,368

[22] Filed: Mar. 13, 1997

Related U.S. Application Data

[63] Continuation of Ser. No. 330,328, Oct. 27, 1994, abandoned.

[30] Foreign Application Priority Data

Oct. 27, 1993 [EP] European Pat. Off. ............ 93117412

[51] Int. Cl.$^6$ .................................................. B60K 41/04
[52] U.S. Cl. ................................................ 477/110; 123/419
[58] Field of Search .................... 477/97, 110; 123/419, 123/422, 423, 425, 334

[56] References Cited

U.S. PATENT DOCUMENTS 4,844,026  7/1989  Tomisawa ............... 123/419 X
5,027,770  7/1991  Yano et al. ............. 477/110 X
5,383,434  1/1995  Kugler et al. ........... 123/419

*Primary Examiner*—Creighton Smith
*Attorney, Agent, or Firm*—Herbert L. Lerner; Laurence A. Greenberg

[57] ABSTRACT

A method and an engine control for suppressing vibration in the drive train of a motor vehicle include detecting a variable being dependent on a speed of an engine, deriving and evaluating a gradient from the variable, reducing a torque of the engine by varying an ignition angle if impermissible vibration is detected, and controlling the torque reduction as a function of an upper and a lower threshold value for the gradient. An ignition intervention is carried out for reducing the engine torque if the gradient is below the lower threshold. The ignition intervention is cancelled if the gradient exceeds the upper threshold value. First lower threshold values are stored in a first performance graph, and second higher threshold values are stored in a second performance graph to which a switchover is made after a first tripping of an anti-bucking function.

11 Claims, 4 Drawing Sheets

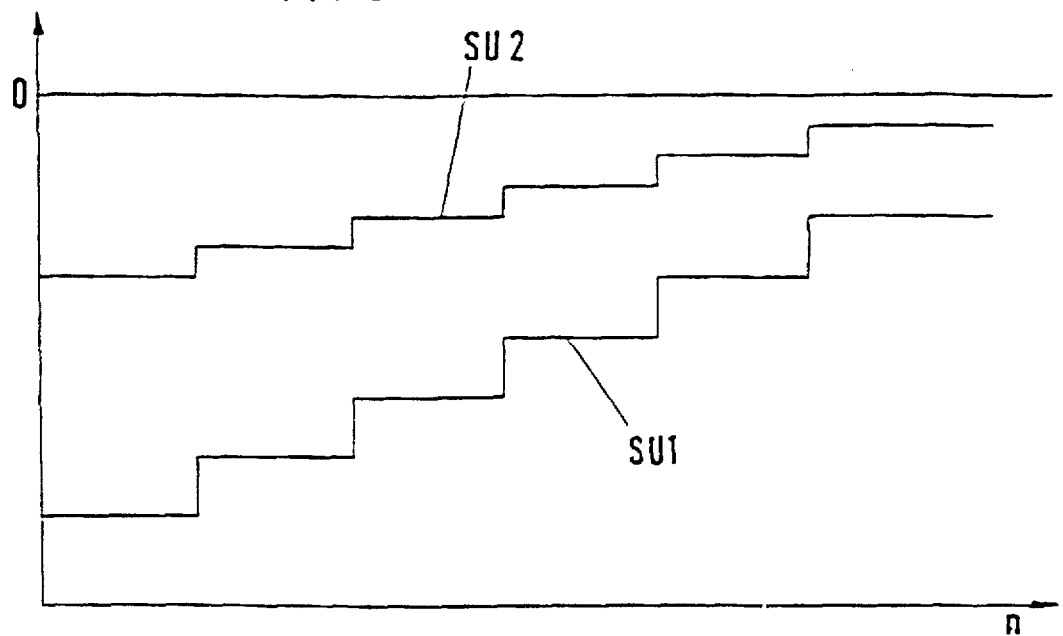

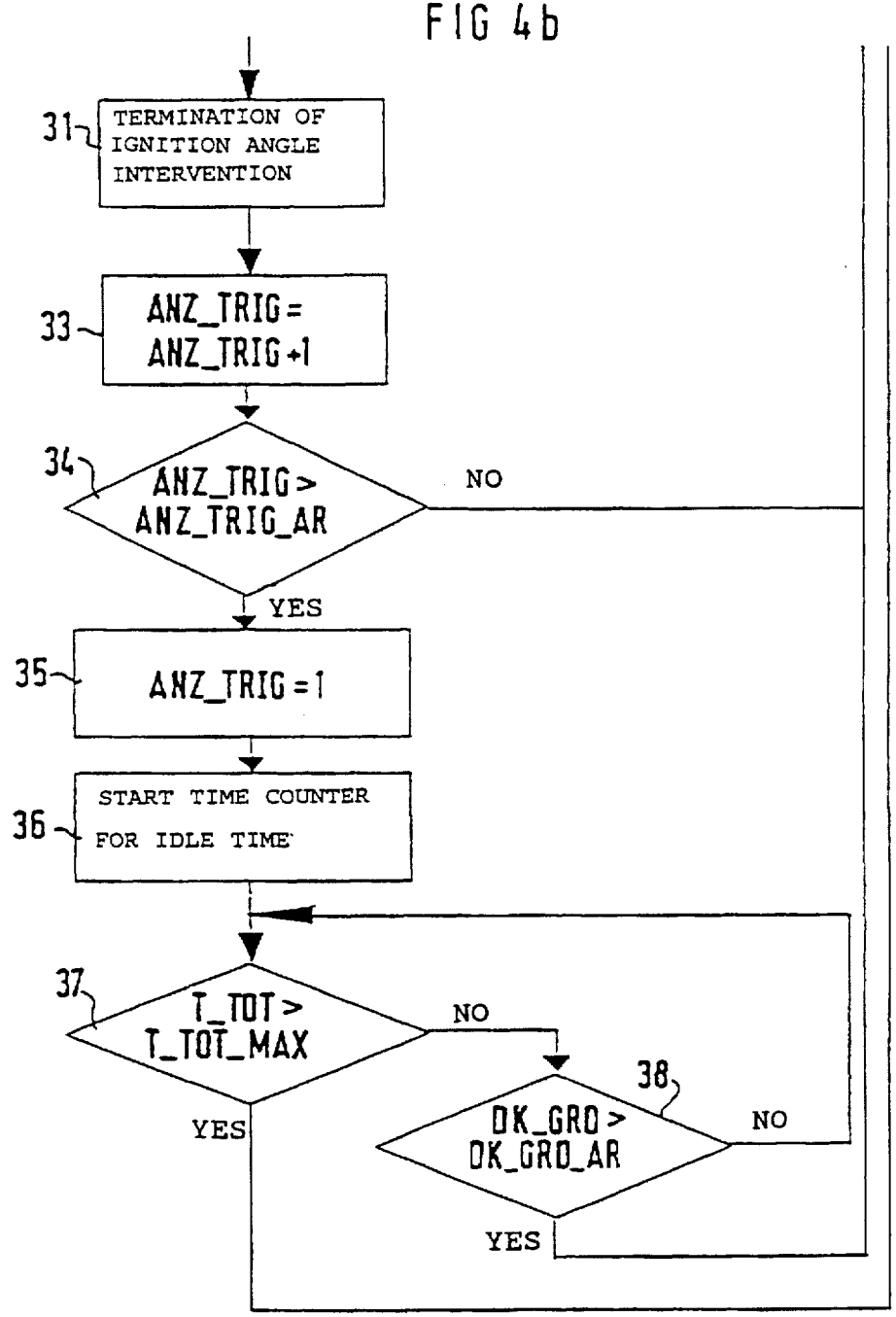

1

METHOD AND ENGINE CONTROL FOR SUPPRESSING VIBRATION OF THE DRIVE TRAIN IN A MOTOR VEHICLE

This application is a continuation of application Ser. No. 08/330,328, filed on Oct. 27, 1994 now abandoned.

BACKGROUND OF THE INVENTION

Field of the Invention

The invention relates to a method for suppressing vibration in the drive train of a motor vehicle, in which a variable being dependent on a speed of an engine is detected, a gradient is derived from the variable and evaluated, and a torque of the engine is reduced by varying an ignition angle if impermissible vibration is detected, wherein the torque reduction is controlled as a function of an upper and a lower threshold value for the gradient. The invention also relates to an engine control operating according to that method.

One such method, which is known from German Published, Non-Prosecuted Application DE 40 09 791 A1, serves to suppress vibration in the drive train of a motor vehicle having an engine speed which is detected by a sensor. When such vibration occurs, the engine is supplied with a correcting variable that is ascertained in a correction device, which lowers the engine torque by varying the ignition timing. The ignition timing is varied, for instance, by switching over from a first to a second ignition performance graph in an ignition control unit.

In a closed-loop control device for the engine of a motor vehicle which is also known, vibrations of the body upon vehicle acceleration are prevented by adjusting the ignition timing. To that end, the engine speed, the change in engine speed over time, and the direction of engine speed change are detected. The ignition timing read from a performance graph is corrected in accordance with the magnitude and sign (+ or −) of the change in engine speed, according to German Published, Non-Prosecuted Application DE 37 17 368 A1.

However, the vibration in the drive drain of a motor vehicle, which is also known as bucking and occurs particularly upon an abrupt transition from low partial load to full load in the lower engine speed range during an acceleration, is sensitive to closed-loop control interventions.

SUMMARY OF THE INVENTION

It is accordingly an object of the invention to provide a method and an engine control for suppressing vibration of the drive train in a motor vehicle, which overcome the hereinafore-mentioned disadvantages of the heretofore-known methods and devices of this general type and which suppress such vibration in a gentle way.

With the foregoing and other objects in view there is provided, in accordance with the invention, in a method for suppressing vibration in the drive train of a motor vehicle, which includes detecting a variable being dependent on a speed of an engine, deriving and evaluating a gradient from the variable, reducing a torque of the engine by varying an ignition angle if impermissible vibration is detected, and controlling the torque reduction as a function of an upper and a lower threshold value for the gradient, the improvement which comprises carrying out an ignition intervention reducing the engine torque if the gradient is below the lower threshold; cancelling the ignition intervention if the gradient exceeds the upper threshold value; and storing first lower threshold values in a first performance graph, and storing second higher threshold values in a second performance graph to which a switchover is made after a first tripping of an anti-bucking function.

In accordance with another mode of the invention, there is provided a method which comprises switching over back from the second performance graph to the first performance graph after a predetermined number of trippings of the anti-bucking function or after a predetermined length of time.

In accordance with an added mode of the invention, there is provided a method which comprises carrying out the ignition intervention if an acceleration enrichment is detected by the engine control.

In accordance with an additional mode of the invention, there is provided a method which comprises predetermining the lower and upper threshold values as a function of a particular gear being selected.

In accordance with yet another mode of the invention, there is provided a method which comprises calculating the gradient at low engine speeds from two successive segment times, and calculating the gradient at high engine speeds from two successive revolution times.

In accordance with yet a further mode of the invention, there is provided a method which comprises adjusting the ignition angles toward "late" upon a switchover to a torque-reducing ignition performance graph, and adjusting an amount by which the ignition angles are adjusted toward "late" in dependence on the engine speed n and an engine load.

In accordance with yet an added mode of the invention, there is provided a method which comprises assuming higher values for the lower threshold value and assuming lower values for the upper threshold value, at higher engine speeds than at lower engine speeds.

In accordance with yet an additional mode of the invention, there is provided a method which comprises delaying the adjustment of the ignition angle by a predetermined period of time.

In accordance with again another mode of the invention, there is provided a method which comprises adjusting the ignition angles back to the original value after a predetermined maximum time is exceeded, even if the upper threshold value has not been exceeded by the gradient.

With the objects of the invention in view, there is also provided, in an engine control with suppression of vibration of a drive train of a motor vehicle, including means for detecting a variable being dependent on a speed of an engine, means for deriving and evaluating a gradient from the variable, and means for reducing a torque of the engine by varying an ignition angle if impermissible vibration is detected, the improvement comprising a first performance graph in which first lower threshold values are stored, and a second performance graph in which second higher threshold values are stored and to which a switchover is made after a first tripping of an anti-bucking function.

The advantages of the invention reside particularly in the fact that with it, the dependency of the drive train vibration on the engine speed, vehicle speed, gear selected, or the applicable gear ratio and the progress of the closed-loop control process, can be taken into account as well. Other features which are considered as characteristic for the invention are set forth in the appended claims.

Although the invention is illustrated and described herein as embodied in a method and an engine control for suppressing vibration of the drive train in a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a diagram showing starting thresholds used in the method of FIG. 2 as a function of engine speed; and FIGS. 4a and 4b are parts of a flow chart of the method according to the invention.

DESCRIPTION OF THE PREFERRED EMBODIMENTS

Figure 1:
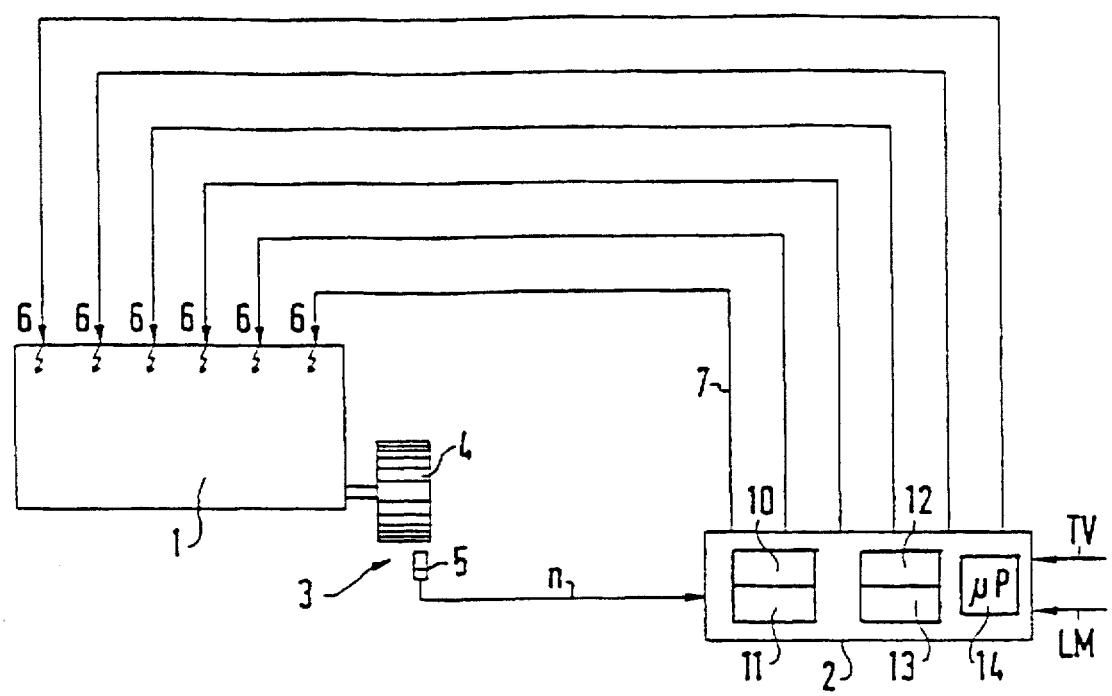
FIG. 1 is a partly diagrammatic view and partly block circuit diagram of an engine of a motor vehicle and an engine control according to the invention.

Referring now to the figures of the drawing in detail and first, particularly, to FIG. 1 thereof, there is seen a diagrammatic and block circuit illustration of components of a motor vehicle drive train that are required for explaining the method of the invention. An engine 1 is controlled by an engine control or engine control unit 2. The engine control 2 receives engine speed values from an engine speed sensor 3, which includes a gear wheel 4 and an inductive sensor 5. The gear wheel 4 is secured to a crankshaft of the engine. The inductive sensor 5 evaluates changes in a magnetic field that are caused by teeth of the gear wheel 4 which move past the sensor. As a rule, 58 teeth are present.

In the engine control 2, the engine speed is detected and processed in the form of segment times. In a six-cylinder engine, one segment time TN corresponds to a crankshaft angle KW of 120° and is measured as the time during which teeth numbers 1–21, for instance, move past the inductive sensor 5. In a five-cylinder engine, a segment time is equivalent to a crankshaft angle KW of 144°, and in a four-cylinder engine to a crankshaft angle KW of 180°. The segment time is inversely proportional to the rpm n: TN~1/n.

The engine control 2 also processes a signal LM that provides information on the mass of air being aspirated. This signal is furnished by a known, non-illustrated air flow rate meter in the intake manifold of the engine 1. It can also process a tachometer signal TV that provides information on the vehicle speed.

Control outputs of the engine control 2 are connected to spark plugs 6 over lines 7. In a known manner, the engine control 2 controls even more functions of the engine 1, such as the injection of fuel, but these are not shown in this case because they are unaffected by the invention. The invention suppresses vibration that arises in the drive train by means of a purposeful reduction in engine torque effected by adjusting the ignition angle toward "late" during the positive half-wave in the engine speed oscillation.

The evaluation of the engine speed is performed in the engine control 2 through segment time gradients. A segment time gradient TN_GRD is calculated as follows:

for low engine speeds, from two successive segment times:

$$TN\_GRD = (TN_n - TN_{n-1})/TN_n,$$

and for high engine speeds, from two successive revolution times:

$$TN\_GRD = (TU_n - TU_{n-1})/TU_n$$

The segment time gradients are freshly calculated for each segment. The boundary between the two types of calculation is at a predetermined engine speed of 1900 rpm, for instance.

The engine control 2 contains a plurality of performance graphs, of which only four are shown in this case. A first or basic ignition performance graph 10 stores the ignition angles as a function of the engine speed, and the engine load or throttle valve position. A second ignition performance graph 11 stores corresponding ignition times for a reduced engine torque. The reduction in engine torque can be performed by switching over from the ignition performance graph 10 to the ignition performance graph 11, or by calculation of ignition angles that are shifted toward "late".

First and second further performance graphs 12 and 13 contain threshold values to be explained below, for activating an anti-bucking function or in other words for tripping the reduction in torque.

Figure 2:
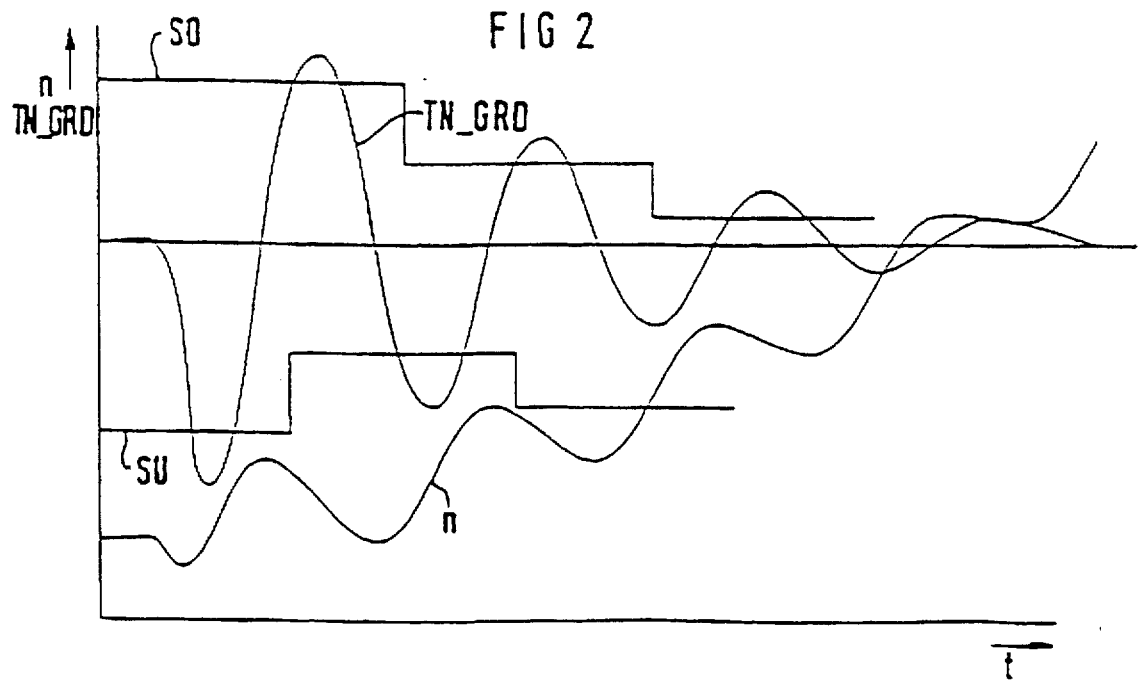
FIG. 2 is a diagram explaining an anti-bucking function according to the invention.

In FIG. 2, the engine speed n upon vehicle acceleration and the segment time gradient TN-GRD derived from it, as well as a lower threshold value SU and an upper threshold value SO, are plotted over time t. In order to activate the anti-bucking function, the following conditions must be met.

The coolant temperature must be above a predetermined value, for instance above 300° C.

The engine speed must be in a predetermined range, for instance between 1000 and 3500 rpm.

The vehicle speed must be within a predetermined range, for instance below 50 km/h.

The engine must be operating at partial load.

No diagnostic errors must have been detected for the crankshaft, camshaft, ignition and injection.

The anti-bucking function is activated through a performance graph switchover: the threshold values for tripping the torque reduction are stored in memory in the two threshold value performance graphs 12 and 13 shown in FIG. 1. If the segment time gradient drops below the associated lower threshold value in the first threshold value performance graph 12, then an ignition angle intervention is carried out, by switching over from the first or basic ignition performance graph 10 to the second ignition performance graph 11. After the thus-effected triggering of the anti-bucking function, or in other words after the ignition time has been shifted toward "late", a switchover to the second threshold value performance graph 13, which has higher thresholds than the first performance graph 12, is carried out. After a freely determinable number of triggerings (for instance 2 to 3 triggerings), but at the latest after a predeterminable period of time (such as 750 ms) which is calculated beginning with the first triggering, a switchover back to the first performance graph 12 is effected.

If the rpm gradient receives the respective upper threshold value SO, then the anti-bucking function (which is also referred to below as the AR function) is turned off, or in other words a switchover back to the basic ignition performance graph 10 is made. The lower threshold value SU and the upper threshold value SO are dependent on the engine speed n. At higher engine speeds, the lower threshold value assumes higher values, and the upper threshold value assumes lower values, than at low engine speeds. This can be seen from FIG. 2, in which with increasing time the engine speed becomes greater, and on average the two threshold values SU and SO approach one another.

The adjustment of the ignition angle toward "late" upon activation of the anti-bucking function is performed with a limitation in the range of change (for instance, to 6° of ignition angle per segment), by means of which discontinuities in the ignition angle are damped.

Once the aforementioned number of triggerings has been accomplished, or in other words the predetermined number of engine interventions with torque reduction have been carried out, or once a predetermined maximum period of time $T_{MAX}$ has elapsed, an idle time TOTZ_AR begins, during which the AR function remains deactivated. However, if the throttle value gradient, or in other words the rate of change of the throttle valve actuation, exceeds a predetermined threshold value during the idle time, then the idle time is discontinued. The AR function can then be tripped again.

The command ignition angle resulting from the anti-bucking function, in accordance with the ignition performance graph 11, is compared with the command ignition angles that result from other ignition angle corrections at partial load or full load, and whichever ignition angle is later is then established. The transition in the "early" direction to the basic ignition angle once the torque reduction has been ended is always performed with a limitation in the rate of change of the ignition angle.

The torque reduction can also be tripped by a detection of acceleration enrichment. The threshold values for tripping the ignition intervention are stored in memory in a performance graph, such as the threshold value performance graph 12. Once the leading edge of a signal that indicates an acceleration enrichment operating state BA has been detected, the anti-bucking function is activated for a period of time T_MAX_BA. If the segment time gradient drops below the corresponding threshold value of the performance graph during this period of time, then a predeterminable number of triggerings or trippings of the ignition intervention takes place. Upon the first triggering, a second, likewise predetermined period of time begins. After one of these periods of time, or the predetermined number of triggerings, has elapsed, the AR function is inactivated until such time as a leading edge of the signal "BA" is again detected.

The torque reduction is also discontinued if the operating states known as overrunning reduction or overrunning shut-off are active.

With higher and higher gears, the frequency of bucking vibrations rises. Therefore, by means of a gear detection that is carried out from the engine speed and from the vehicle speed signal by means of a microprocessor 14 contained in the engine control 2, the following variables are adapted to the various gears. As the gear number increases:

- the threshold values SU for tripping the AR function become higher, and the threshold values SO for ending the function are made lower;
- the ignition angle rate of change limitations is increased, and the number of segments for delaying the change in ignition angle is reduced;
- the maximum intervention time T_MAX is shortened.

FIG. 3 shows the dependency of the lower threshold values or starting thresholds SU1 (SU from performance graph 12) and SU2 (SU from performance graph 13) for the AR function on the engine speed.

Figure 4A:
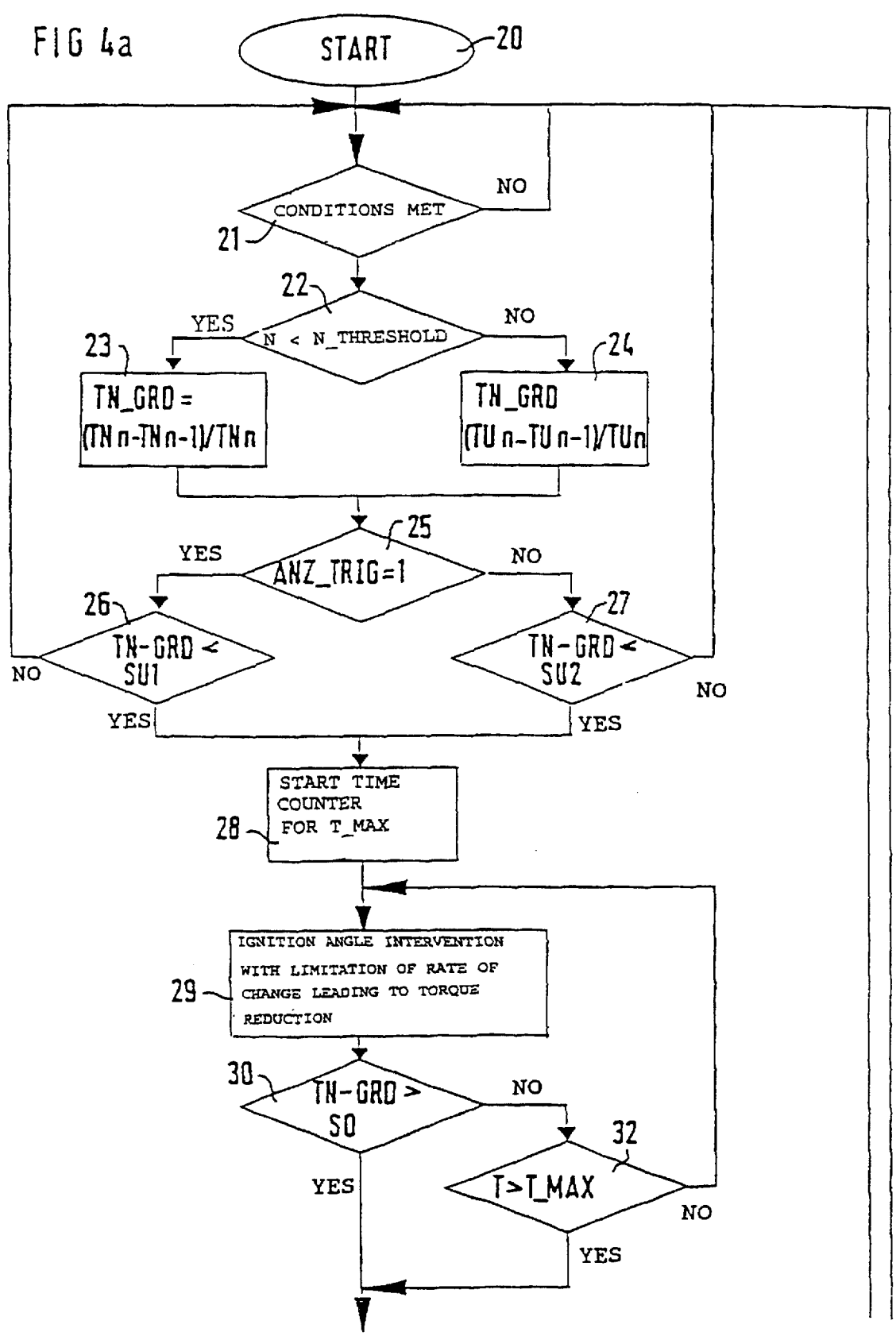

FIGS. 4a and 4b show a flowchart of the program that the microprocessor 14 of the engine control 2 goes through in executing the anti-bucking function:

After a starting step 20 in FIG. 4a, it is ascertained in an interrogation step 21 whether or not the aforementioned conditions for the AR function are met. If not, a jump back to the start is made. If they are, then in an interrogation step 22 it is ascertained whether or not the engine speed is below a predetermined threshold, of 1900 rpm, for instance. If so, the segment time gradient is calculated in a block 23 from two successive segment times. If not, it is calculated in a block 24 from two successive revolution times.

In a question step 25 it is ascertained whether or not the number of triggerings equals 1. If so, then in a question step 26 it is ascertained whether the segment time gradient is less than the lower threshold value SU1 from the first threshold value performance graph 12. In not, then in an interrogation step 27 it is ascertained whether or not it is less than the lower threshold value SU2 from the performance graph 13. If the result of the respective interrogation is negative, a jump is made back to the start. If it is positive, then in both cases in a step 28 the start of a time counter for the maximum period of time T_MAX takes place.

In a program step 29, an ignition angle intervention with rate of change limitation is carried out and this leads to a reduction in the engine torque.

In an interrogation step 30, it is ascertained whether or not the segment time gradient is higher than the upper threshold value SO. If so, then in a step 31 seen in FIG. 4b the ignition angle intervention is ended. If not, then in an interrogation step 32 it is ascertained whether or not the maximum period of time T_MAX has elapsed. If not, a jump is made back to before the step 29. If so, then the ignition angle intervention is ended in the step 31.

In a step 33, the number of triggerings is raised by 1. In a question step 34 it is ascertained whether or not the predetermined maximum number of triggerings of the AR function has been exceeded. If not, a jump back to the start is made. If so, then in a step 35 the number of triggerings is set equal to one. In a step 36, a time counter for the idle time TOTZ_AR is started.

In a question block 37 it is ascertained whether or not the maximum idle time has been exceeded. If so, a jump is made back to the start. If not, it is ascertained in an interrogation block 38 whether or not the throttle value gradient exceeds a predetermined value. If not, a jump is made back to before the step 37. If so, a jump is made back to the start. This ends the run through the program.

In the above-described exemplary embodiments, the information about the engine speed has always been evaluated by way of the segment time gradient. Instead of using the segment time gradients TN-GRD, the anti-bucking system can also be controlled and carried out by using the engine speed gradient dn/dt. However, in that case the upper and lower threshold values must be transposed.

We claim:

1. In a method for suppressing vibration in a drive train of a motor vehicle, which includes detecting a variable being dependent on a speed of an engine, deriving and evaluating a gradient from the variable, reducing a torque of the engine by varying an ignition angle if impermissible vibration is detected, and controlling the torque reduction as a function of an upper and a first lower threshold for the gradient, the improvement which comprises:

carrying out an ignition intervention reducing the engine torque if a gradient is below the first lower threshold;

cancelling the ignition intervention if the gradient exceeds the upper threshold;

defining a second lower threshold being greater than the first lower threshold and lower than the upper threshold; and storing values of the first lower threshold in a first performance graph, storing values of the second lower threshold in a second performance graph, and switching over to the second performance graph after a first tripping of an anti-bucking function.

2. The method according to claim 1, which comprises switching over back from the second performance graph to the first performance graph after a predetermined number of trippings of the anti-bucking function.

3. The method according to claim 1, which comprises switching over back from the second performance graph to the first performance graph after a predetermined length of time.

4. The method according to claim 1, which comprises carrying out the ignition intervention if an acceleration demand is detected by an engine control.

5. The method according to claim 1, which comprises predetermining the lower and upper threshold values as a function of a particular gear being selected.

6. The method according to claim 1, which comprises calculating the gradient at low engine speeds from two successive segment times, and calculating the gradient at high engine speeds from two successive revolution times.

7. The method according to claim 1, which comprises adjusting the ignition angles toward "late" upon a switchover to a torque-reducing ignition performance graph, and adjusting an amount by which the ignition angles are adjusted toward "late" in dependence on the engine speed n and an engine load.

8. The method according to claim 1, which comprises assuming higher values for the lower threshold value and assuming lower values for the upper threshold value, at higher engine speeds than at lower engine speeds.

9. The method according to claim 1, which comprises delaying an adjustment of on ignition angle by a predetermined period of time.

10. The method according to claim 4, which comprises adjusting the ignition angles back to an original value after a predetermined maximum time is exceeded, even if the upper threshold value has not been exceeded by the gradient.

11. In an engine control with suppression of vibration of a drive train of a motor vehicle, including means for detecting a variable being dependent on a speed of an engine, means for deriving and evaluating a gradient from the variable, and means for reducing a torque of the engine by varying an ignition angle if impermissible vibration is detected, the improvement comprising:

a memory in which values of an upper threshold, a first lower threshold, and a second lower threshold which is greater than the first lower threshold are stored, and whereby the engine control switches from the first lower threshold to the second lower threshold after a first tripping of an anti-bucking function.

* * * * *